US012603805B2

(12) United States Patent
Sinha

(10) Patent No.: US 12,603,805 B2
(45) Date of Patent: Apr. 14, 2026

(54) BPSK SUBCARRIER DEMODULATION USING DIRECT FILTERS WITHOUT DOWN CONVERSION

(71) Applicant: Tektronix, Inc., Beaverton, OR (US)

(72) Inventor: Sakchi Sinha, Bengaluru (IN)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 18/628,510

(22) Filed: Apr. 5, 2024

(65) Prior Publication Data

US 2025/0317342 A1 Oct. 9, 2025

(51) Int. Cl.
H04L 27/26 (2006.01)
H04L 5/00 (2006.01)

(52) U.S. Cl.
CPC ........ H04L 27/2627 (2013.01); H04L 5/0007 (2013.01); H04L 27/26025 (2021.01)

(58) Field of Classification Search
CPC . H04L 27/26; H04L 27/2627; H04L 27/2639; H04L 27/2637; H04L 27/263; H04L 27/26025; H04L 27/2602; H04L 27/2603; H04L 5/006; H04L 5/0007; H04L 5/001
See application file for complete search history.

(56) References Cited

U.S. PATENT DOCUMENTS

| | | | | |
|---|---|---|---|---|
| 7,505,745 B1 * | 3/2009 | Marko | ................... | H04B 1/001 |
| | | | | 455/13.1 |
| 2005/0008066 A1 * | 1/2005 | Takahashi | ............. | G01S 19/235 |
| | | | | 342/357.68 |
| 2007/0025430 A1 * | 2/2007 | Rasmussen | ......... | H04L 27/2275 |
| | | | | 375/150 |
| 2007/0058753 A1 * | 3/2007 | Saavedra | ................. | H03D 3/26 |
| | | | | 375/376 |
| 2009/0268937 A1 * | 10/2009 | Baum | ..................... | G06T 1/005 |
| | | | | 382/280 |

* cited by examiner

*Primary Examiner* — Khanh C Tran
(74) *Attorney, Agent, or Firm* — Miller Nash LLP; Andrew J. Harrington

(57) ABSTRACT

A test and measurement system includes a proximity coupling device to transmit a wireless carrier signal and a proximity integrated circuit card to load modulate the transmitted wireless carrier signal to generate a BPSK-modulated subcarrier signal on the transmitted wireless carrier. A test and measurement instrument acquires the wireless carrier signal and includes a BPSK subcarrier filtering demodulator to demodulate the carrier signal including the BPSK-modulated subcarrier signal without performing down conversion of the wireless carrier signal. The BPSK subcarrier filtering demodulator low pass filters the wireless carrier signal including the BPSK-modulated subcarrier signal to generate a low pass filtered BPSK-modulated subcarrier signal and detects amplitude peaks in the low pass filtered BPSK-modulated subcarrier signal. The BPSK subcarrier filtering demodulator generates a BPSK-demodulated signal in response to the detected amplitude peaks.

19 Claims, 5 Drawing Sheets

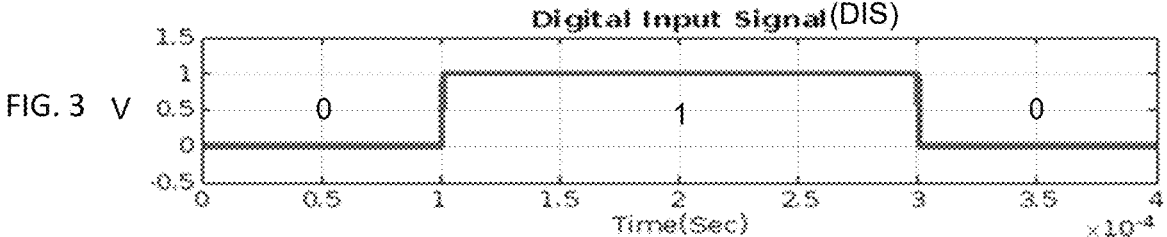
FIG. 3
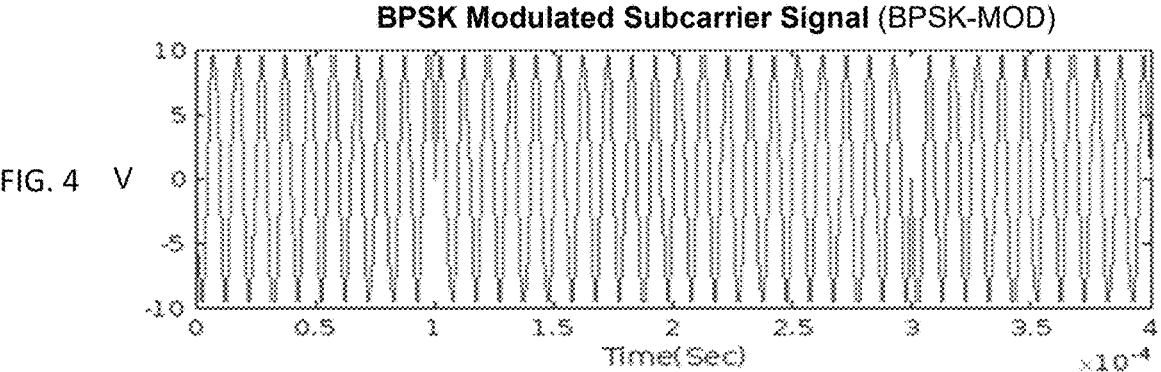
FIG. 4
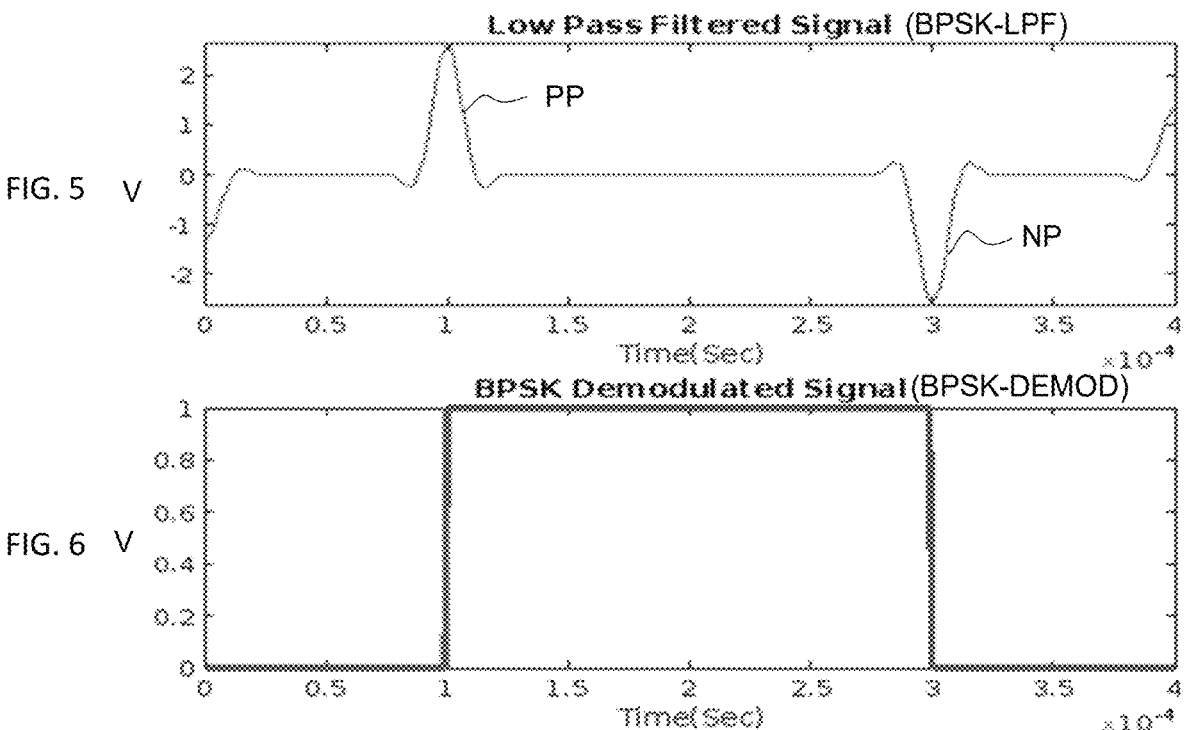
FIG. 5
FIG. 6

BPSK-MOD

BPSK-LPF

BPSK-DEMOD

BPSK-DEMOD

RDATA

BPSK SUBCARRIER DEMODULATION USING DIRECT FILTERS WITHOUT DOWN CONVERSION

TECHNICAL FIELD

The present disclosure relates generally to the demodulation of a binary phase shift keying (BPSK) modulated signal, and more specifically to the demodulation of a BPSK modulated signal using filtering and without performing down conversion of the modulated signal.

BACKGROUND

Near Field Communication (NFC) is a series of wireless communications protocol standards defining communication between two electronic devices spaced a short-range from one another. NFC provides communication between two NFC-enabled electronic devices through a wireless carrier signal and magnetic field coupling of two antennas on the two NFC-enabled electronic devices. Many different types of electronic devices utilize NFC in a wide variety of applications such as mobile payments and radio frequency identification (RFID) tags for applications such as access authentication for doors of residential and commercial buildings as well as vehicles. NFC-enabled electronic devices may be passive devices like RFID tags or active devices like smartphones or payment terminals that initiate a communication session with a proximate passive device. This communication is termed "near field" communications because the distance between two devices is much less than the length of a wavelength of the wireless carrier signal. For example, when the wireless carrier signal is a 13.56 MHz carrier signal, the wavelength is approximately twenty-two (22) meters while typical distance between the polling and listening NFC-enabled devices is on the order of 10 cm or less.

A typical NFC system includes a Proximity Coupling Device (PCD) and a Proximity Integrated Circuit Card (PICC). The PCD may also be referred to as a "reader" or "polling device" and the PICC referred to as a "tag" or "listening device" in the present description. The PCD and PICC are magnetically coupled to wirelessly communicate through one of the NFC standard communication protocols, with the PCD modulating an amplitude of a carrier signal to communicate commands to the PICC and the PICC decoding and responding to these commands through load modulation. Different types of load modulation are utilized in different NFC standards. NFC-A type devices communicate according to the ISO/IEC 14443A standard in which a PCD utilizes amplitude modulation to send commands to a PICC which, in turn, responds to these commands utilizing on-off keying (OOK) for the load modulation, where OOK is a type of amplitude-shift keying (ASK). NFC-B type devices communicate according to the ISO/IEC 14443B standard in which a PCD utilizes amplitude modulation to send commands to a PICC and the PICC utilizes load modulation to generate a binary phase shift keying (BPSK) modulated signal to respond to these commands.

The number of applications in which NFC is being utilized is ever increasing, and in each such new application the testing of NFC-enabled devices is important to ensure proper operation. Manufacturers of test and measurement equipment, such as oscilloscopes, manufacture mixed signal oscilloscopes (MSOs) that include radio frequency (RF) channels for testing of wireless electronic devices such as NFC-enabled devices. As part of testing NFC-enabled devices, the oscilloscope demodulates a received wireless signal using the appropriate demodulation. This demodulation typically includes generation of a replica carrier signal in the oscilloscope for down conversion of the received wireless signal. When a replica carrier signal is utilized for demodulation, phase synchronization of the replica carrier signal and the modulated carrier signal transmitted by the PCD is required. Any phase difference may result in distortion of the demodulated signal. Techniques for phase synchronization of carrier signals are known, but many of these known techniques may be relatively computationally intensive and thus more difficult to implement in devices having more limited computational resources, such as test and measurement instruments. Accordingly, there is a need for improved techniques of demodulating wireless signals which may be implemented in test and measurement instruments like oscilloscopes or other devices to enable the instruments to conduct, for example, testing of NFC-enabled devices.

BRIEF DESCRIPTION OF ACCOMPANYING DRAWINGS

Figure 2:
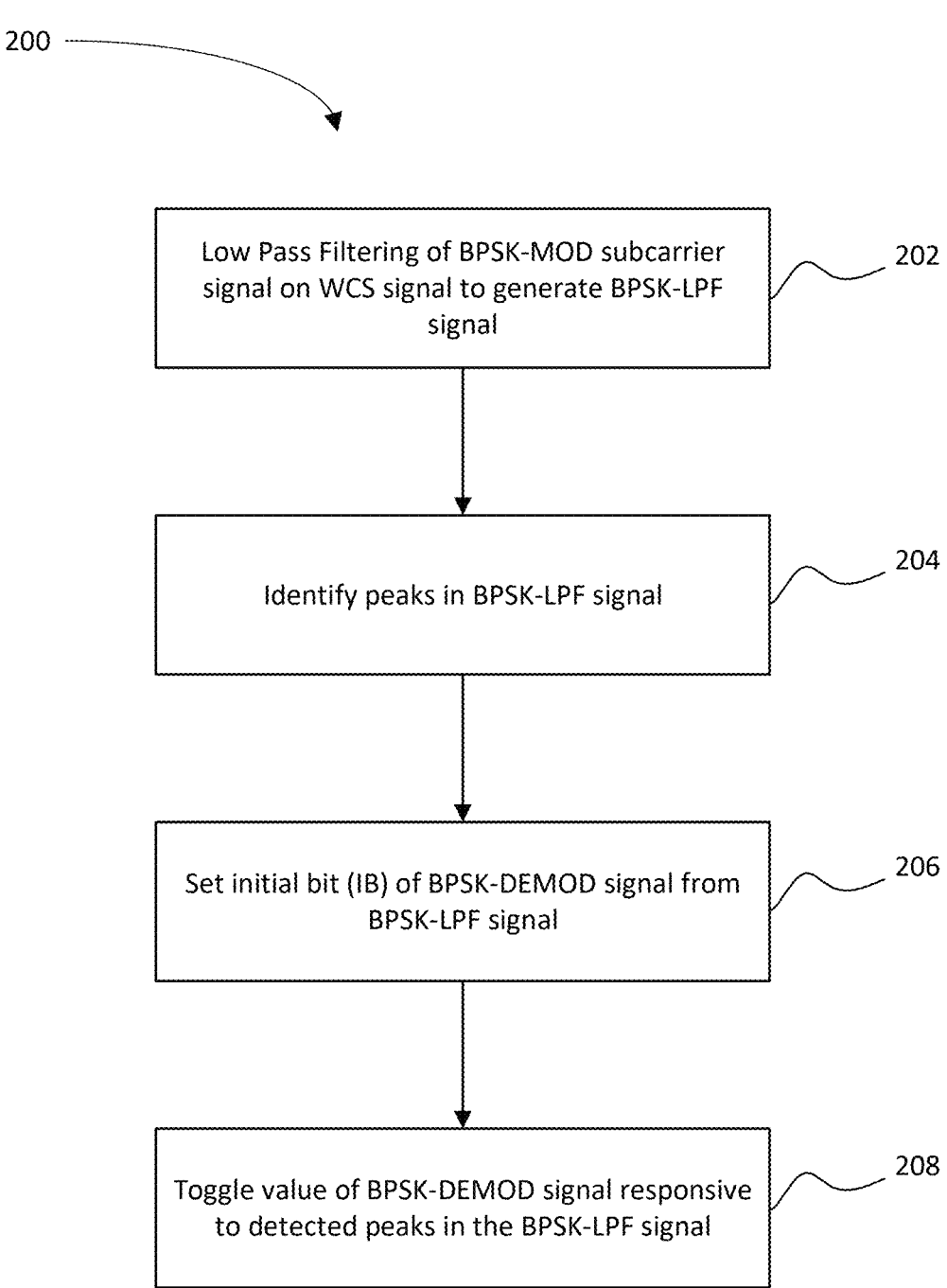
FIG. 2 is a flowchart of an example process executed by the BPSK subcarrier filtering demodulator of FIG. 1 in accordance with some embodiments of the present disclosure.

FIGS. 3, 4, 5, and 6 are signal diagrams showing signals utilized and generated by the BPSK subcarrier demodulation process of FIG. 2, according to embodiments of the present disclosure.

Figure 1:
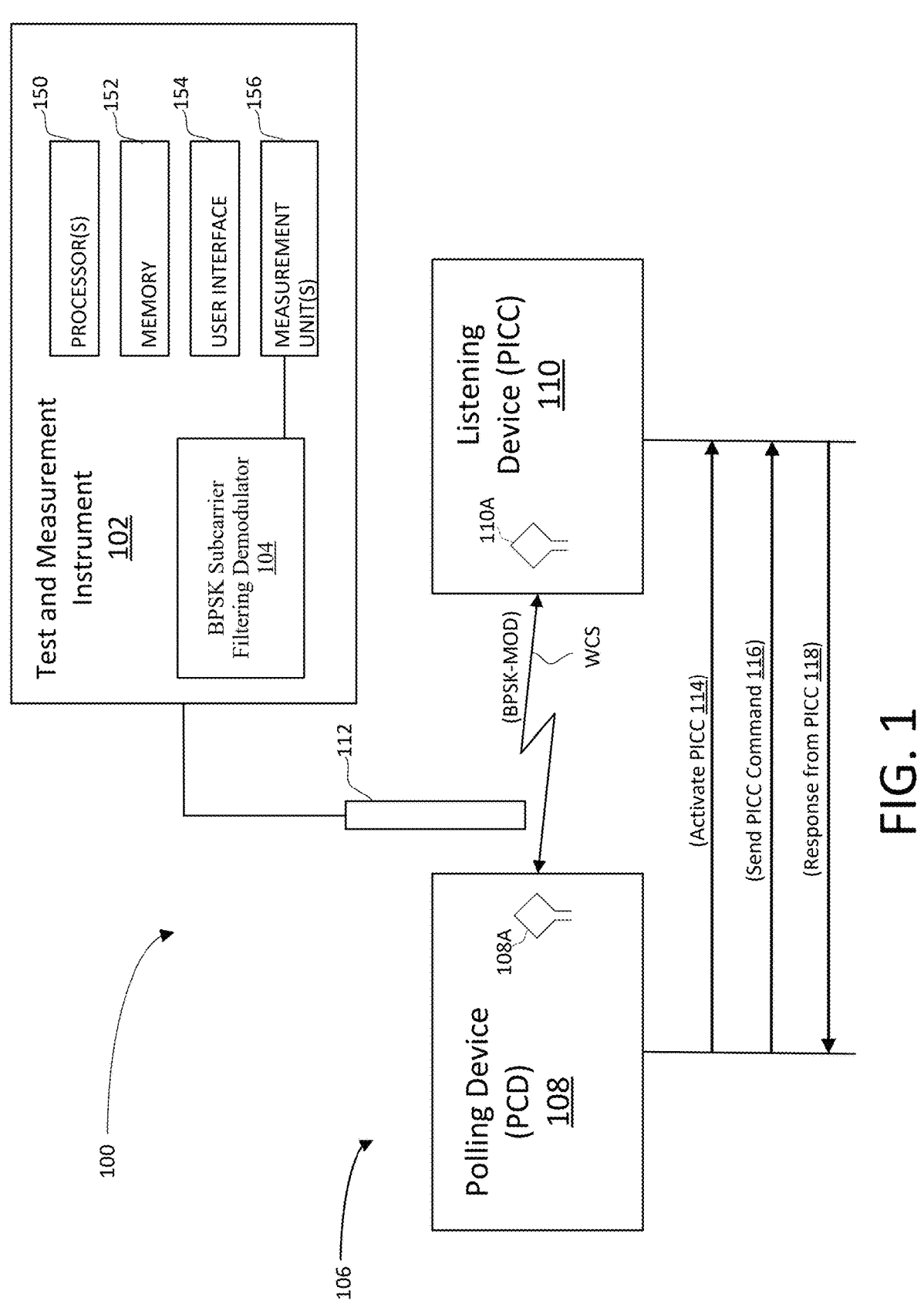
FIG. 1 illustrates a test and measurement system including a test and measurement instrument including a BPSK subcarrier filtering demodulator for use in testing NFC-enabled devices in accordance with some embodiments of the present disclosure.
Figure 7:
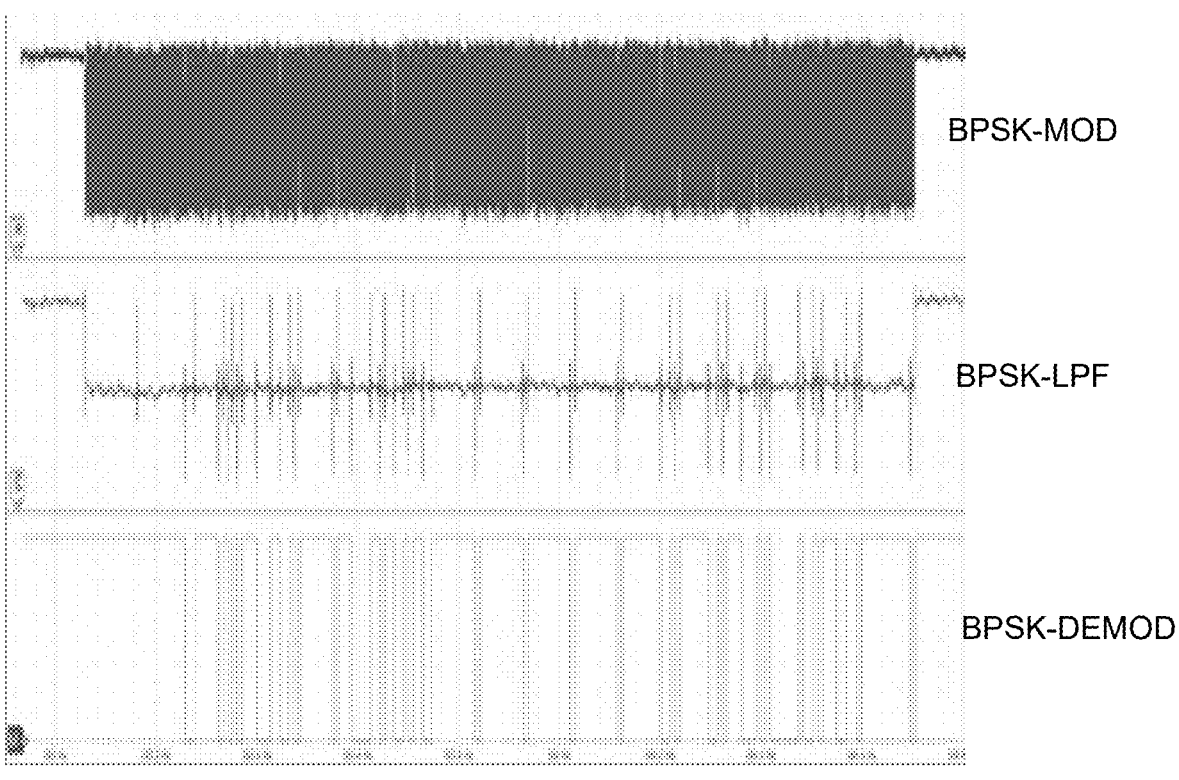
Figure 8:
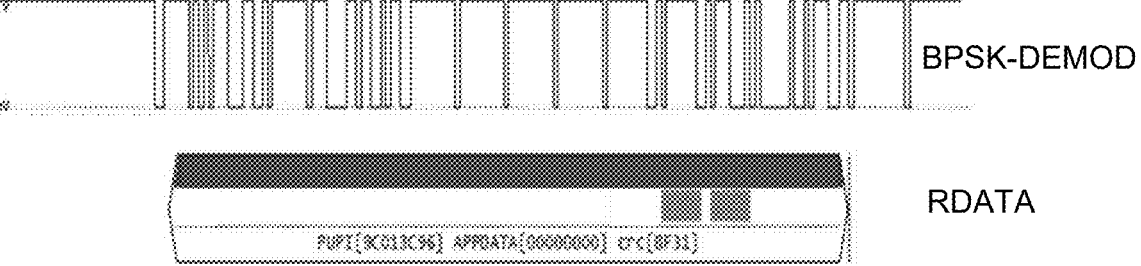

FIGS. 7-8 illustrate selected signals of the BPSK subcarrier demodulation process of FIG. 2 as captured and decoded by the test and measurement instrument of FIG. 1 during testing of NFC-enabled devices in accordance with embodiments of the present disclosure.

Figure 9:
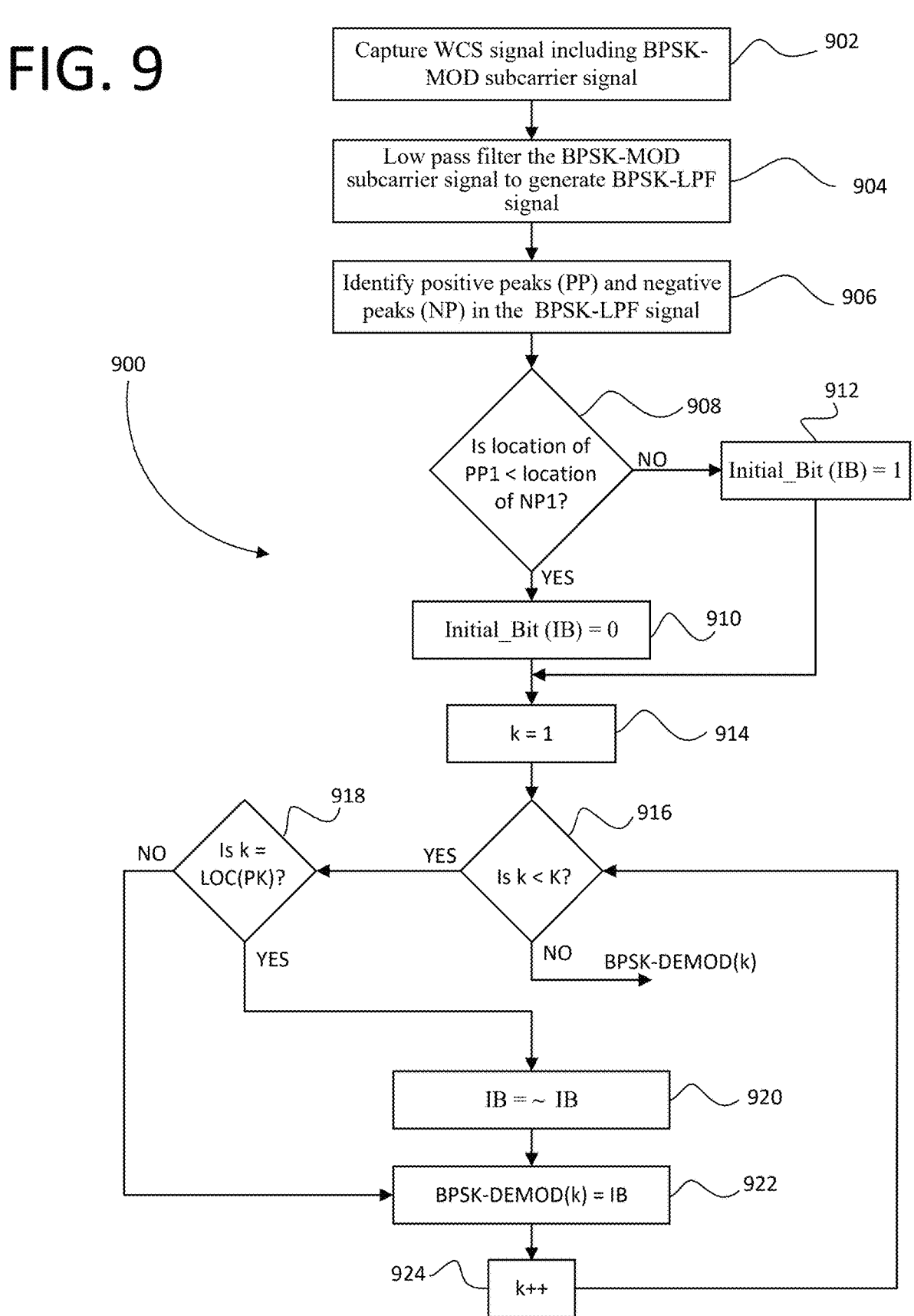

FIG. 9 is a flowchart illustrating in more detail a BPSK subcarrier demodulation process in accordance with some embodiments of the present disclosure.

It should be appreciated by those skilled in the art that any block diagrams herein represent conceptual views of illustrative methods embodying the principles of the present disclosure. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Embodiments of the present disclosure are directed to methods of demodulating a binary phase shift keying (BPSK) modulated signal and systems for performing such demodulation. The method includes low pass filtering the BPSK-modulated signal to generate a low pass filtered BPSK-modulated signal and detecting amplitude peaks in the low pass filtered BPSK-modulated signal. A BPSK-demodulated signal is generated in response to the detected amplitude peaks. This method enables demodulation of the BPSK-modulated signal without performing any down conversion of a carrier signal containing the BPSK-modulated signal as a subcarrier. Conventional demodulation of a modulated carrier signal including a BPSK-modulated subcarrier signal requires the generation of a replica carrier signal by a device receiving the modulated carrier signal. The replica carrier signal is used in down conversion of the modulated carrier signal as part of demodulating the BPSK-modulated subcarrier signal. Methods and systems according to embodiments of the present disclosure eliminate the need for such a replica carrier signal and down conversion. The methods may be used in the testing of listening devices (PICC) in NFC-B applications to demodulate a BPSK-modulated subcarrier signal generated by a listening device (PICC) through load modulation of a wireless modulated carrier signal generated by a polling device (PCD). In some embodiments, a test and measurement system for testing listening devices (PICC) in NFC-B applications includes a test and measurement instrument, such as an oscilloscope, including a BPSK subcarrier filtering demodulator to low pass filter a wireless carrier signal including a BPSK-modulated subcarrier signal, detect amplitude peaks in the low pass filtered BPSK-modulated subcarrier signal, and generate a BPSK-demodulated signal in response to the detected amplitude peaks.

FIG. 1 is a block diagram of a test and measurement system 100 including a test and measurement instrument 102 that includes a BPSK subcarrier filtering demodulator 104 for demodulating a BPSK-modulated subcarrier signal BPSK-MOD during testing of NFC-enabled devices 106 in accordance with embodiments of the present disclosure. The test and measurement instrument 102 includes one or more main processors 150 that may be configured to execute instructions from main memory 152 and may perform any methods and/or associated steps indicated by such instructions. A user interface 154 is coupled to the one or more processors 150 and may include, for example, a keyboard, mouse, touchscreen, output display, file storage, and/or any other controls employable by a user to interact with the test and measurement instrument 102. In some embodiments the user interface 154 may be connected to or controlled by a remote interface (not illustrated), so that a user may control operation of the instrument 102 in a remote location physically away from the instrument. A display portion of the user interface 154 may be a digital screen such as an LCD, or any other monitor to display waveforms, measurements, and other data to a user. In some embodiments, the main output display of the user interface 154 may also be located remote from the instrument 102.

One or more measurement units 156 perform the main functions of measuring parameters and other qualities of signals from the devices being measured by the instrument 102. Typical measurements include measuring voltage, current, and power of input signals in the time domain, as well as measuring features of the input signals in the frequency domain. The measurement units 156 represent any measurements that are typically performed on test and measurement instruments, and the BPSK subcarrier filtering demodulator 104 may be integrated within or coupled to such measurement units 156.

FIG. 1 also illustrates NFC-enabled devices 106 including a polling device or Proximity Coupling Device (PCD) 108 and a listening device or Proximity Integrated Circuit Card (PICC) 110, which are NFC-B type devices in the embodiment of FIG. 1 and thus communicate through NFC communications according to the ISO/IEC 14443B standard. In operation, the polling device 108 transmits NFC wireless carrier signal WCS to both power and communicate commands to the listening device 110, and the listening device performs load modulation of the wireless carrier signal to generate the BPSK-modulated subcarrier signal BPSK-MOD on the wireless carrier signal for communicating responses to the polling device. A radio frequency (RF) probe 112 is coupled to an input of the test and measurement instrument 102 and is suitably positioned, or coupled to the listening device 110, to sense the wireless carrier signal WCS. During testing of the NFC-enabled devices 106, the test and measurement instrument 102 captures the wireless carrier signal WCS as sensed by the RF probe 112, and the BPSK subcarrier filtering demodulator 104, without performing down conversion of the captured wireless carrier signal WCS, demodulates the BPSK-modulated subcarrier signal BPSK-MOD contained on the captured wireless carrier signal for use in testing the listening device 110.

As previously mentioned, the polling device 108 and listening device 110 communicate through NFC communications, with the wireless carrier signal WCS representing this NFC communications in FIG. 1. The characteristics of the wireless carrier signal WCS and NFC communications between the polling and listening devices 108, 110 will now be briefly described in more detail in order to better understand the operation of the BPSK subcarrier filtering demodulator 104 according to embodiments of the present disclosure. Each of the polling and listening devices 108, 110 includes a respective antenna 108A, 110A, each antenna coupled to electronic components (not shown) in the corresponding polling or listening device 108, 110. These antennas 108A, 110A are physically positioned proximate one another so that the antennas are inductively coupled through the wireless carrier signal WCS in the same way as are inductors of a transformer. The antennas 108A, 110A may thus be viewed a coils of an air core transformer, with the wireless carrier signal WCS representing an alternating magnetic field WCS that is generated by the polling device 108 through an alternating signal applied to the antenna 108A. This alternating signal is a 13.56 MHz carrier signal as specified in the ISO/IEC 14443B standard when the polling and listening devices 108, 110 are NFC-B type devices. Those skilled in the art will understand the characteristics of the magnetic coupling and NFC between the antennas 108A, 110A of the polling and listening devices 108, 110 relative to conventional far field propagation of electromagnetic signals between antennas. Accordingly, the characteristics of NFC are discussed briefly herein but are not described in detail and such details are not necessary for an understanding of embodiments of the present disclosure.

In operation during an NFC communication session, the polling device 108 and listening device 110 communicate commands and responses through wireless carrier signal WCS to exchange information. An NFC communication session is represented in FIG. 1 through an activate PICC command 114, a send PICC command 116, and a response from PICC 118. The polling device 108 occasionally transmits the wireless carrier signal WCS to determine whether any listening devices 110 are located proximate the polling device. When the listening device 110 is proximate the polling device 108, the wireless carrier signal WCS is received by the antenna 110A of the listening device 110 and, where the listening device is a passive device, this signal is rectified and used to provide electrical power to electrical components in the listening device. This receipt of the wireless carrier signal WCS and generation of power therefrom corresponds to the activate PICC command 114 of FIG. 1. After the activate PICC command 114, the polling device 108 provides a PICC command 116 to the listening device by modulating the wireless carrier signal WCS. The type of modulation used by the polling device 108 to send PICC commands 116 is Amplitude shift keying (ASK) according to the ISO/IEC 14443B standard when the polling and listening devices 108, 110 are NFC-B type devices.

The listening device 110 receives this ASK-modulated wireless carrier signal WCS and demodulates the signal to decode the command sent by the polling device 108. The listening device 110 then processes the decoded command and sends an appropriate response 118 corresponding to the decoded command. To send the response, the listening device 110 load modulates the wireless carrier signal WCS. Load modulation varies an impedance of the antenna 110A of the listening device 110 and, due to the magnetic coupling of the antennas 108A, 110A, this variation of impedance of the antenna 110A causes a change in the signal at the antenna 108A of the polling device 108. In this way, the listening device 110 modulates the wireless carrier signal WCS to send a response 118 to the polling device 108. Where the polling and listening devices 108, 110 are NFC-B type devices communicating according to the ISO/IEC 14443B standard, the listening device 110 uses a subcarrier at 848 KHz that is modulated through BPSK. Thus, the listening device 110 load modulates the wireless carrier signal WCS to include a BPSK-modulated subcarrier signal containing the response 118 to the command 116 sent by the polling device 108. It is this BPSK-modulated subcarrier signal forming the response 118 from the listening device 110 that the BPSK subcarrier filtering demodulator 104 of the test and measurement instrument 102 demodulates during testing of the polling and listening devices 108, 110, as will now be described in more detail with reference to FIGS. 1-3.

FIG. 2 is a flowchart of an example process 200 executed by the BPSK subcarrier filtering demodulator 104 of FIG. 1 in accordance with some embodiments of the present disclosure. The process 200 will now be described in more detail with reference to FIGS. 1-8, where FIGS. 3-8 illustrate signals received and generated by the process 200 during operation. The process 200 begins at operation 202 and in which the BPSK-MOD subcarrier signal contained on the wireless carrier signal WCS is low pass filtered to thereby generate a low pass filtered BPSK-modulated subcarrier signal BPSK-LPF. As described above with reference to FIG. 1, the wireless carrier signal WCS includes the BPSK-modulated subcarrier signal generated by the listening device 110 in response to the command received from the polling device 108. The low pass filtering in operation 202 has a cutoff frequency fc selected so that this filtering filters out or removes the wireless carrier signal WCS and low pass filters of the BPSK-modulated subcarrier signal contained on the WCS signal to generate the low pass filtered BPSK-modulated subcarrier signal BPSK-LPF.

FIGS. 3-5 illustrate several signals involved in the low pass filtering of operation 202. FIG. 3 illustrates a digital input signal DIS, where the DIS signal represents a baseband signal that is utilized to by the listening device 110 to BPSK modulate a subcarrier signal in generating the response 118 to the command 116 from the polling device 108. The subcarrier signal is an 848 KHz signal when the polling and listening devices 108, 110 are NFC-B type devices communicating according to the ISO/IEC 14443B standard, as mentioned above. FIG. 4 illustrates the BPSK-modulated subcarrier signal BPSK-MOD, which is the 848 KHz subcarrier modulated by the DIS signal through BPSK modulation. As seen in FIG. 4, the DIS signal phase modulates the subcarrier signal at times 1 and 3 from a first phase to a second phase to generate the BPSK-modulated subcarrier signal shown.

FIG. 5 shows the resulting low pass filtered BPSK-modulated subcarrier signal BPSK-LPF generated at operation 202. At times 1 and 3, the BPSK-LPF signal includes peaks that result from the corresponding changes in phase of the BPSK-MOD subcarrier signal at times 1 and 3 as seen in FIG. 4. As will be understood by those skilled in the art, a low pass filter provides an output having a value that is a function of a rate of change component and accordingly the increased rate of change of the BPSK-MOD subcarrier signal when a binary phase change occurs results in peaks in the BPSK-LPF signal. The BPSK-LPF signal includes a positive peak PP at time 1 and a negative peak NP at time 3.

From operation 202, the process 200 goes to operation 204 and identifies peaks in the BPSK-LPF signal generated in operation 202. These identified peaks will include both positive peaks PP and negative peaks as shown FIG. 5, with a positive rate of change in the BPSK-MOD signal resulting from a phase change such as shown at time 1 in FIG. 4 generating a positive peak PP in the BPSK-LPF signal. Conversely, a negative rate of change in the BPSK-MOD signal resulting from a phase change such as shown at time 3 in FIG. 4 generates a negative peak NP in the BPSK-LPF signal. In operation 204, the process 200 identifies peaks in the BPSK-LPF signal. The operation 204 detects a positive or negative peak PP, NP in the BPSK-LPF signal upon detecting that the amplitude of the BPSK-LPF signal exceeds a positive peak threshold PPTH or negative peak threshold NPTH, respectively.

Once all of the positive and negative peaks PP, NP in the BPSK-LPF signal have been detected, the process 200 proceeds to operation 206 and identifies the logic level of an initial bit IB of a BPSK-demodulated signal BPSK-DEMOD that is generated by the process 200 executed by the BPSK subcarrier filtering demodulator 104 of FIG. 1. In identifying the logic level of the initial bit IB of the BPSK-demodulated signal BSPK-DEMOD, the operation determines whether a location of a first positive amplitude peak PP1 is before a location of a first negative amplitude peak NP1 in the BPSK-LPF signal. The logic level of the initial bit IB of the BPSK-demodulated signal BSPK-DEMOD provided by the demodulator 104 will determine whether the initial amplitude peak of the BPSK-LPF signal is a positive peak or a negative peak, as will now be explained in more detail with reference to FIGS. 3 and 4. In the example illustrated in FIGS. 3 and 4, a logic 0 of the digital input signal DIS has a low voltage (zero volts in FIG. 3) while a logic 1 has a high voltage (one volt in FIG. 3).

If the first positive peak PP of the BPSK-LPF signal occurs or is located before the first negative peak NP, as seen for the peaks PP and NP in the BPSK-LPF signal of FIG. 5, then the initial bit IB of the BPSK-DEMOD signal is a logic 0. This is seen to be the case for DIS signal of FIG. 3 where the initial logic 0 is assumed to be the first bit of this signal. In contrast, when the first negative peak NP of the BPSK-LPF signal occurs or is located before the first positive peak PP, then the initial bit IB of the BPSK-DEMOD signal is a binary 1 (not illustrated). Once the operation 206 has determined whether the first positive peak PP occurs before the first negative peak NP in the BPSK-LPF signal, the value of the initial bit IB of the BPSK-DEMOD signal is then set accordingly to either a logic 0 or 1 in the operation 206.

After the initial bit IB has been set in operation 206, the process 200 proceeds to operation 208 and generates the subsequent bits of the BPSK-DEMOD signal by toggling the value or logic level of the signal in response to each detected peak in the BPSK-LPF signal. As seen in FIGS. 3-5, each peak PP or NP of the BPSK-LPF signal corresponds to a transition of DIS signal from one logic level to the complementary logic level, namely from logic 0 to logic 1 or logic 1 to logic 0. Thus, once the proper logic level for the initial bit IB of the BPSK-DEMOD signal is known, the logic level of the signal simply needs to be toggled to the complementary logic level in response each detected peak in the BPSK-LPF signal to thereby demodulate the BPSK-MOD signal and provide the BPSK-DEMOD signal. The term "toggled" as used herein means to change the logic level of the BPSK-DEMOD signal from a first logic level (i.e., logic 0 or logic 1) to the complementary logic level (i.e., logic 1 or logic 0). FIG. 6 is a signal diagram showing the BPSK-DEMOD signal corresponding to the simplified example illustrated for the DIS signal, BPSK-MOD signal, and BPSK-LPF signals shown in FIGS. 3-5. The bits of the BPSK-DEMOD signal correspond to the bits of the original DIS signal, as seen by comparing FIGS. 3 and 6.

FIGS. 7-8 illustrate selected signals of the BPSK demodulation process 200 of FIG. 2 as captured, decoded, and displayed by an oscilloscope forming the test and measurement instrument 102 of FIG. 1 during testing of the NFC-enabled devices 106 in accordance with embodiments of the present disclosure. FIG. 7 illustrates signal timing diagrams of the BPSK-MOD, BPSK-LPF, and BPSK-DEMOD signals as captured and generated on the oscilloscope 102. Each signal timing diagram shows voltage along the vertical axis and time along the horizontal axis. The top diagram shows the BPSK-MOD subcarrier signal forming the response 118 of the listening device 110 during an NFC communication session. The middle diagram shows the BPSK-LPF signal, which is the low pass filtered BPSK-MOD subcarrier signal shown in the top diagram. The positive peaks PP and negative peaks NP as discussed above in relation to FIG. 5 are seen in the BPSK-LPF signal shown in the middle diagram of FIG. 7. The bottom diagram of FIG. 7 shows the BPSK-DEMOD signal (i.e., the demodulated BPSK-MOD signal) as generated by the BPSK subcarrier filtering demodulator 104.

FIG. 8 illustrates a signal timing diagram of the BPSK-DEMOD signal at the top and decoded response data RDATA at the bottom. The response data RDATA corresponds to BPSK-DEMOD signal as decoded by the test and measurement instrument 102 (FIG. 1) in accordance with the ISO/IEC 14443B standard used in conjunction with NFC-B type devices. The 14443B standard specifies the format of commands 116 and responses 118 including defining fields contained in these command and responses. In the example of FIG. 8, the decoded response RDATA includes a decoded Pseudo Unique PICC Identifier (PUPI) field, an application data field APPDATA, and a cyclic redundancy check (CRC) field. The test and measurement 102, or a user of the instrument, may then use this response data RDATA in testing proper operation of the polling device (PCD) 108 and listening device (PICC) 110 during testing of these NFC-enabled devices.

FIG. 9 is a flowchart illustrating in more detail a BPSK subcarrier demodulation process 900 in accordance with some embodiments of the present disclosure. The BPSK subcarrier demodulation process 900 corresponds to one embodiment of the BPSK subcarrier demodulation process 200 of FIG. 2, and which may be executed by the BPSK subcarrier filtering demodulator 104 or other components of the test and measurement instrument 102 (FIG. 1) during testing of the NFC-enabled devices 106. The process 900 specifically shows in more detail the determination of the initial bit IB of the BPSK-DEMOD signal and the determination of subsequent bits of this signal in response to detected peaks in the BPSK-LPF signal. As described above, the test and measurement instrument 102 captures the wireless carrier signal as sensed by the RF probe 112, and the BPSK subcarrier filtering demodulator 104, without performing down conversion of the captured wireless carrier signal WCS, demodulates the BPSK-modulated subcarrier signal BPSK-MOD contained on the captured wireless carrier signal for use in testing the polling device 108 and listening device 110.

In capturing the WCS signal the test and measurement instrument 102 digitizes the signal for subsequent processing. Thus, each of the signals being processed by the process 900 is a digital signal. As a result, digital signal notation including an index may be used when referring to selected ones of these signal to facilitate the description of the process 900.

The process 900 begins at operation 902 in which the modulated wireless carrier signal WCS being communicated between the polling and listening devices 108, 110 is captured by the test and measurement instrument 102. The WCS signal includes the BPSK-modulated subcarrier signal BPSK-MOD that is to be demodulated by the BPSK subcarrier filtering demodulator 104. From operation 902 the process 900 goes to operation 904 and low pass filters the BPSK-MOD signal contained of the WCS signal to generate the low pass filtered BPSK-modulated subcarrier signal BPSK-LPF[k], where k is the index for each value of the digital low pass filtered signal and k={0 to K−1}, where K is the total number of values of the BPSK-LPF[k] signal. After having generated the BPSK-LPF[k] signal in operation 904, the process 900 proceeds to operation 906 and detects the positive and negative peaks PP, NP in the BPSK-LPF[k] signal. The operation 906 stores the locations of detected peaks as a data structure LOC[k], where k is the value of each index of the BPSK-LPF[k] signal containing a detected positive or negative peak PP, NP.

As part of detecting the positive and negative peaks PP, NP of the BPSK-LPF[k] signal, the operation 906 also performs checks on the detected peaks PP, NP to ensure an identified peak is actually a peak in the BPSK-LPF[k] signal corresponding to a phase change of the BPSK-MOD signal and is not due to glitch or noise present on the BPSK-MOD signal. More specifically, in some embodiments of the process 900, the operation 906 calculates a time difference between each pair of consecutive peaks initially detected in the BPSK-LPF[k] signal. Each index k is associated with a particular time in the BPSK-LPF[k] signal and therefore difference between the indices k of two consecutive peaks corresponds to a time. Thus, if a first peak is at LOC[k1] and a next peak at subsequent location LOC[k2] then (k2−k1) indicates a time difference between these two peaks. The operation 906 determines whether this calculated time difference between consecutive peaks is an integer multiple of the inverse of a data rate DR of the BPSK-MOD subcarrier signal as defined in the ISO/IEC 14443B standard. Only if the time difference $(k2-k1)=(N \times 1/DR)$, where N is an integer, are the consecutive peaks considered to be reliable peaks corresponding to a phase change in the BPSK-MOD signal and generated responsive to corresponding bit changes in the original DIS signal. If the time difference between consecutive peaks is not an integer multiple of the inverse of the data rate DR, then the peaks are considered as being noise or a "glitch" and are discarded from the LOC[k] data structure prior to using this structure to toggle bits in the BPSK-DEMOD signal, as will be described in more detail below.

From operation 906, the process 900 proceeds to operation 908 and the logic level of the initial bit IB of the BPSK-DEMOD[k] signal is determined. This determination is made in operations 908-912 of process 900. More specifically, the operation 908 determines whether LOC[k1] of a first positive peak PP in the BPSK-LPF[k] signal, which is designated PP1 in FIG. 9, is less than the location LOC[k2] of a first negative peak NP, which is designated a NP1 in FIG. 9. This determination in operation 908 determines whether the first positive peak PP1 occurs before the first negative peak NP1. The index k1 indicates the location of the first positive peak PP1 and index k2 indicates the location of the first negative peak NP1 in the BPSK-LPF[k] signal. If the determination in operation 908 is true, then the process 900 goes from operation 908 to operation 910 and the initial bit IB of the BPSK-DEMOD[k] signal is set to logic 0 (IB=0). In contrast, when the determination in operation 908 is false, then the process 900 goes from operation 908 to operation 912 and the initial bit IB of the BPSK-DEMOD[k] signal is set to logic 1 (IB=1). The index k=0 for the initial bit IB of the BPSK-DEMOD[k] signal and thus in operation 910 the signal BPSK-DEMOD[0]=0 and in operation 912 BPSK-DEMOD[0]=1. The initial bit IB is a variable in the process 900, and is used in further operations of the process as will be described below.

From either operation 910 or 912, the process 900 then proceeds to operation 914 and the index k is set equal to 1 (k=1). The index k is then sequentially incremented and used to sequentially step through the samples of the BPSK-LPF [k] and set bit values of the BPSK-DEMOD[k] signal responsive to detected peaks as indicated in the LOC[k] data structure generated in operation 906. From operation 914, the process 900 goes to operation 916 and determines whether k<K, where K is the total number of values of the BPSK-LPF[k] signal. The size of the BPSK-LPF[k] signal is K where k {0, K–1}. When the determination in operation 916 is true, the process 900 goes to operation 918 and determines whether the current k is equal to the location of a peak as indicated by the data structure LOC[k]. This is indicated as LOC[PK] in operation 918 where PK corresponds to the k values for the peaks as indicated the data structure LOC[k]. Thus, if k=LOC[PK] then this means that the current k value corresponds to the location of one of the detected peaks in the LOC[k] data structure. When the determination in operation 918 is positive, the process goes to operation 920 and the value of the initial bit IB is complemented. Thus, in operation 920, if the initial bit IB was set to 0 (IB=0) in operation 910 then in operation 920 the initial bit IB is set to 1 (IB=1), and if the initial bit IB was set to 1 (IB=1) in operation 912 then in operation 920 the initial bit IB is set to 0 (IB=0). The initial bit IB is a variable used by the process 900 as previously mentioned, and is more specifically a binary variable having a value of either a logic 1 or logic 0. In operation 920, the value of the initial bit IB variable is complemented or toggled.

After operation 920, the process 900 proceeds to operation 922 and sets current value k of the BPSK-DEMOD(k) signal equal to the value of the variable initial bit IB (BPSK-DEMOD(k)=IB). In the process 900, the operation 922 is also reached when the determination in operation 918 is negative. When the determination in operation 918 is negative, the process 900 goes directly to operation 922 and sets the current value k of the BPSK-DEMOD(k) signal equal to the value of the variable initial bit IB without that value of the initial bit IB having been complemented in operation 920. Thus, in this situation the current value of the BPSK-DEMOD(k) signal remains the same as the prior value BPSK-DEMOD(k–1), meaning the value of the BPSK-DEMOD(k) signal is not toggled. From operation 922, the process 900 goes to operation 924 and the index k is incremented (k++) and the process returns to operation 916. The process 900 continues executing the operations 916-924, storing the proper logic 1 or 0 value for each of the k index values for the BPSK-DEMOD(k) signal, until the determination in operation 916 is negative. When the determination in operation 916 is negative, all values of the BPSK-LPF[k] signal have been processed and the process 900 has generated the BPSK-DEMOD[k] signal, at which point the process 900 has been completed for the BPSK-MOD subcarrier signal contained on the most recently captured WCS signal.

In embodiments of the present disclosure, the BPSK subcarrier filtering demodulator 104 uses low pass filtering the BPSK-modulated signal and the subsequently uses characteristics of this the low pass filtered BPSK-modulated signal BPSK-LPF to demodulate the BPSK-MOD subcarrier signal contained the wireless carrier signal WCS without performing any down conversion of a wireless carrier signal containing the BPSK-MOD signal. This eliminates the need for generating a replica carrier signal to demodulate the BPSK-MOD signal. Conventional BPSK demodulation relies on accurate synchronization of the frequency and phase of the carrier signal generated in the transmitter and the replica carrier generated in the receiver. Any frequency or phase mismatch between these two carrier signals can lead to errors in demodulation, and achieving and maintaining synchronizing between these two carrier signals is challenging in wireless communication systems. Small frequency offsets between the two carrier signals can cause phase rotation in the received BPSK-modulated signal, resulting in errors during demodulation. Moreover, where the test and measurement instrument 102 is an oscilloscope to test NFC-enabled devices 106, the frequency of the carrier signal is independent of the incoming signal (spectrum trace) and cannot be adjusted after down conversion. Embodiments of the present disclosure eliminate the need for generating a replica carrier signal in the receiver, which would be the polling device 108 in NFC test and measurement system of FIG. 1.

Embodiments of the BPSK subcarrier filtering demodulator 104 utilize RC low pass filtering or a finite impulse response (FIR) low pass filter. The RC filter may be a single pole RC filter in embodiments of the demodulator 104. Moreover, embodiments of the BPSK subcarrier filtering demodulator 104 are not limited to demodulating BPSK modulated signals in NFC communications. The demodulator 104 demodulates BPSK-modulated signals in other applications as well, including applications where the BPSK-modulated signal changes phase more slowly. The low pass filtering used by the demodulator 104 is discriminating enough to detect slower phase transitions in such lower frequency BPSK-modulated signals. As mentioned above, in NFC applications the BPSK modulation is used as a subcarrier and the subcarrier frequency is approximately 848 KHz. Even in applications where the BPSK-modulated signal changes phase more slowly, the low pass filtering used by the demodulator 104 is able to capture or identify these phase transitions in the form of spikes or peaks generated in the BPSK-LPF signal. In addition, as discussed above in relation to operation 906 in the process 900 of FIG. 9, the demodulation performed by the demodulator 104 is resistant to crosstalk or other interference that may affect the BPSK-LPF signal generated by the low pass filtering to prevent any such spikes or glitches as being interpreted as bit transition during demodulation. Embodiments of the demodulator 104 may also result in reduced computation time for demodulating the BPSK-modulated signal compared to convention approaches using a replica carrier signal.

Aspects of the disclosure may operate on particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

EXAMPLES

Illustrative examples of the technologies disclosed herein are provided below. A configuration of the technologies may include any one or more, and any combination of, the examples described below.

Example 1 is a method of demodulating a binary phase shift keying (BPSK) modulated subcarrier signal, including low pass filtering a wireless carrier signal including the BPSK-modulated subcarrier signal to generate a low pass filtered BPSK-modulated subcarrier signal; detecting amplitude peaks in the low pass filtered BPSK-modulated subcarrier signal; and generating a BPSK-demodulated signal in response to the detected amplitude peaks.

Example 2 is a method according to Example 1, wherein low pass filtering the received BPSK-modulated signal includes low pass filtering the received wireless BPSK-modulated signal with one of an RC low pass filter or a finite impulse response (FIR) filter.

Example 3 is a method according to Example 1, wherein detecting amplitude peaks in the low pass filtered BPSK-modulated subcarrier signal comprises identifying positive amplitude peaks and identifying negative amplitude peaks in the low pass filtered BPSK-modulated subcarrier signal.

Example 4 is a method according Example 3, wherein identifying positive amplitude peaks and identifying negative amplitude peaks in the low pass filtered BPSK-modulated subcarrier signal includes determining whether a magnitude of the low pass filtered BPSK-modulated subcarrier signal exceeds a positive peak threshold or a negative peak threshold to identify amplitude peaks; and calculating a time difference between consecutive identified amplitude peaks; and discarding selected ones of the identified consecutive amplitude peaks for which the time difference between the consecutive amplitude peaks is not an integer multiple of the inverse of a data rate of the BPSK-modulated subcarrier signal.

Example 5 is a method according to Example 4, wherein generating the BPSK-demodulated signal includes detecting a logic level of an initial bit of the BPSK-demodulated signal; and toggling the logic level of the BPSK-demodulated signal in response to the detected positive and negative amplitude peaks.

Example 6 is a method according to Example 5, wherein detecting the logic level of the initial bit of the BPSK-demodulated signal includes determining whether a location of a first positive amplitude peak is before a location of a first negative amplitude peak in the low pass filtered BPSK-modulated; setting an initial bit of the BPSK-demodulated signal to a first logic level when the location of the first positive amplitude peak is determined to be before the location of the first negative amplitude peak; and setting the initial bit of the BPSK-demodulated signal to a second logic level when the location of the first positive amplitude peak is determined to be after the location of the first negative amplitude peak.

Example 7 is a method according to Example 6, wherein generating the BPSK-demodulated signal in response to the detected amplitude peaks comprises, after setting the logic level of the initial bit, toggling a logic level of the BPSK-demodulated signal in response to each identified positive and negative amplitude peak.

Example 8 is a method according to Example 1, wherein the wireless carrier signal and BPSK-modulated subcarrier signal are a near field communication (NFC) wireless signals.

Example 9 is a method according to Example 1 further including transmitting, from a proximity coupling device, the wireless carrier signal; and load modulating, through a proximity integrated circuit card, the transmitted wireless carrier signal from the proximity coupling device to generate the BPSK-modulated subcarrier signal on the transmitted wireless carrier signal.

Example 10 is a method according to Example 9, wherein the proximity coupling device modulates the wireless carrier signal to communicate a command to the proximity integrated circuit card.

Example 11 is a method according to Example 10, wherein the proximity integrated circuit card load modulates the wireless carrier signal to generate the wireless BPSK-modulated signal containing information about the proximity integrated circuit card responsive to the command from the proximity coupling device.

Example 12 is a test and measurement system, including a proximity coupling device configured to transmit a wireless carrier signal; a proximity integrated circuit card configured to load modulate the transmitted wireless carrier signal to generate a BPSK-modulated subcarrier signal on the transmitted wireless carrier; and a test and measurement instrument configured to acquire the wireless carrier signal and including a BPSK subcarrier filtering demodulator configured to demodulate the BPSK-modulated subcarrier signal without performing down conversion of the wireless carrier signal.

Example 13 is a test and measurement system according to Example 12, wherein the BPSK subcarrier filtering demodulator is configured to: low pass filter the wireless carrier signal including the BPSK-modulated subcarrier signal to generate a low pass filtered BPSK-modulated subcarrier signal; detect amplitude peaks in the low pass filtered BPSK-modulated subcarrier signal; and generate a BPSK-demodulated signal in response to the detected amplitude peaks.

Example 14 is a test and measurement system according to Example 13, wherein the BPSK subcarrier filtering demodulator is configured to identify positive amplitude peaks and to identify negative amplitude peaks in the low pass filtered BPSK-modulated subcarrier signal.

Example 15 is a test and measurement system according to Example 14, wherein, to generate the BPSK-demodulated signal, the BPSK subcarrier filtering demodulator is configured to detect a logic level of an initial bit of the BPSK-demodulated signal; and toggle the logic level of the BPSK-demodulated signal in response to the detected positive and negative amplitude peaks.

Example 16 is a test and measurement system according to Example 15, wherein, to detect the logic level of the initial bit of the BPSK-demodulated signal, the BPSK subcarrier filtering demodulator is configured to determine whether a location of a first positive amplitude peak is before a location of a first negative amplitude peak in the low pass filtered BPSK-modulated subcarrier signal; setting an initial bit of the BPSK-demodulated signal to a first logic level when the location of the first positive amplitude peak is determined to be before the location of the first negative amplitude peak; and setting the initial bit of the BPSK-demodulated signal to a second logic level when the location of the first positive amplitude peak is determined to be after the location of the first negative amplitude peak.

Example 17 is a test and measurement system according to Example 16, wherein, to generate the BPSK-demodulated signal in response to the detected amplitude peaks, the BPSK subcarrier filtering demodulator is configured, after the logic level of the initial bit is set, to toggle a logic level of the BPSK-demodulated signal in response to each identified positive amplitude peak and each identified negative amplitude peak.

Example 18 is a test and measurement system according to Example 11, wherein the test and measurement instrument is an oscilloscope.

Example 19 is a test and measurement system, including a proximity coupling device configured to transmit a wireless carrier signal; a proximity integrated circuit card configured to load modulate the transmitted wireless carrier signal to generate a BPSK-modulated subcarrier signal on the transmitted wireless carrier; and a test and measurement instrument configured to acquire the wireless carrier signal, the test and measurement instrument including a BPSK subcarrier filtering demodulator configured to demodulate the BPSK-modulated subcarrier signal, the BPSK subcarrier filtering demodulator configured to low pass filter the wireless carrier signal including the BPSK-modulated subcarrier signal to generate a low pass filtered BPSK-modulated subcarrier signal; detect amplitude peaks in the low pass filtered BPSK-modulated subcarrier signal; and generate a BPSK-demodulated signal in response to the detected amplitude peaks.

Example 20 is a test and measurement instrument according to Example 19, wherein the test and measurement instrument is mixed signal oscilloscope.

The foregoing description has been set forth merely to illustrate example embodiments of present disclosure and is not intended to be limiting. Since modifications of the disclosed embodiments incorporating the substance of the invention may occur to person skilled in the art, the invention should be construed to include everything within the scope of the invention.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that all features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

I claim:

1. A method of demodulating a binary phase shift keying (BPSK) modulated subcarrier signal, comprising:

low pass filtering a wireless carrier signal including the BPSK-modulated subcarrier signal to generate a low pass filtered BPSK-modulated subcarrier signal;

identifying positive amplitude peaks and identifying negative amplitude peaks in the low pass filtered BPSK-modulated subcarrier signal; and generating a BPSK-demodulated signal in response to the detected amplitude peaks.

2. The method of claim 1, wherein low pass filtering the received BPSK-modulated signal comprises low pass filtering the received wireless BPSK-modulated signal with one of an RC low pass filter or a finite impulse response (FIR) filter.

3. The method of claim 1, wherein identifying positive amplitude peaks and identifying negative amplitude peaks in the low pass filtered BPSK-modulated subcarrier signal comprises:

determining whether a magnitude of the low pass filtered BPSK-modulated subcarrier signal exceeds a positive peak threshold or a negative peak threshold to identify amplitude peaks;

calculating a time difference between consecutive identified amplitude peaks; and discarding selected ones of the identified consecutive amplitude peaks for which the time difference between the consecutive amplitude peaks is not an integer multiple of the inverse of a data rate of the BPSK-modulated subcarrier signal.

4. The method of claim 3, wherein generating the BPSK-demodulated signal comprises:

detecting a logic level of an initial bit of the BPSK-demodulated signal; and toggling the logic level of the BPSK-demodulated signal in response to the detected positive and negative amplitude peaks.

5. The method of claim 4, wherein detecting the logic level of the initial bit of the BPSK-demodulated signal comprises:

determining whether a location of a first positive amplitude peak is before a location of a first negative amplitude peak in the low pass filtered BPSK-modulated subcarrier signal;

setting an initial bit of the BPSK-demodulated signal to a first logic level when the location of the first positive amplitude peak is determined to be before the location of the first negative amplitude peak; and setting the initial bit of the BPSK-demodulated signal to a second logic level when the location of the first positive amplitude peak is determined to be after the location of the first negative amplitude peak.

6. The method of claim 5, wherein generating the BPSK-demodulated signal in response to the detected amplitude peaks comprises, after setting the logic level of the initial bit, toggling a logic level of the BPSK-demodulated signal in response to each identified positive and negative amplitude peak.

7. The method of claim 1, wherein the wireless carrier signal and BPSK-modulated subcarrier signal are near field communication (NFC) wireless signals.

8. The method of claim 1 further comprising:

transmitting, from a proximity coupling device, the wireless carrier signal; and load modulating, through a proximity integrated circuit card, the transmitted wireless carrier signal from the proximity coupling device to generate the BPSK-modulated subcarrier signal on the transmitted wireless carrier signal.

9. The method of claim 8, wherein the proximity coupling device modulates the wireless carrier signal to communicate a command to the proximity integrated circuit card.

10. The method of claim 9, wherein the proximity integrated circuit card load modulates the wireless carrier signal to generate the wireless BPSK-modulated signal containing information about the proximity integrated circuit card responsive to the command from the proximity coupling device.

11. A test and measurement system, comprising:

a proximity coupling device configured to transmit a wireless carrier signal;

a proximity integrated circuit card configured to load modulate the transmitted wireless carrier signal to generate a BPSK-modulated subcarrier signal on the transmitted wireless carrier; and a test and measurement instrument including one or more processors configured to acquire the wireless carrier signal and including a BPSK subcarrier filtering demodulator configured to demodulate the BPSK-modulated subcarrier signal without performing down conversion of the wireless carrier signal.

12. The test and measurement system of claim 11, wherein the BPSK subcarrier filtering demodulator is configured to:

low pass filter the wireless carrier signal including the BPSK-modulated subcarrier signal to generate a low pass filtered BPSK-modulated subcarrier signal;

detect amplitude peaks in the low pass filtered BPSK-modulated subcarrier signal; and generate a BPSK-demodulated signal in response to the detected amplitude peaks.

13. The test and measurement system of claim 12, wherein the BPSK subcarrier filtering demodulator is configured to identify positive amplitude peaks and to identify negative amplitude peaks in the low pass filtered BPSK-modulated subcarrier signal.

14. The test and measurement system of claim 13, wherein, to generate the BPSK-demodulated signal, the BPSK subcarrier filtering demodulator is configured to:

detect a logic level of an initial bit of the BPSK-demodulated signal; and toggle the logic level of the BPSK-demodulated signal in response to the detected positive and negative amplitude peaks.

15. The test and measurement system of claim 14, wherein, to detect the logic level of the initial bit of the BPSK-demodulated signal, the BPSK subcarrier filtering demodulator is configured to:

determine whether a location of a first positive amplitude peak is before a location of a first negative amplitude peak in the low pass filtered BPSK-modulated subcarrier signal;

set an initial bit of the BPSK-demodulated signal to a first logic level when the location of the first positive amplitude peak is determined to be before the location of the first negative amplitude peak; and set the initial bit of the BPSK-demodulated signal to a second logic level when the location of the first positive amplitude peak is determined to be after the location of the first negative amplitude peak.

16. The test and measurement system of claim 15, wherein, to generate the BPSK-demodulated signal in response to the detected amplitude peaks, the BPSK subcarrier filtering demodulator is configured, after the logic level of the initial bit is set, to toggle a logic level of the BPSK-demodulated signal in response to each identified positive amplitude peak and each identified negative amplitude peak.

17. The test and measurement system of claim 11, wherein the test and measurement instrument is an oscilloscope.

18. A test and measurement system, comprising:

a proximity coupling device configured to transmit a wireless carrier signal;

a proximity integrated circuit card configured to load modulate the transmitted wireless carrier signal to generate a BPSK-modulated subcarrier signal on the transmitted wireless carrier; and a test and measurement instrument configured to acquire the wireless carrier signal, the test and measurement instrument including a BPSK subcarrier filtering demodulator configured to demodulate the BPSK-modulated subcarrier signal, the BPSK subcarrier filtering demodulator configured to:

low pass filter the wireless carrier signal including the BPSK-modulated subcarrier signal to generate a low pass filtered BPSK-modulated subcarrier signal;

detect amplitude peaks in the low pass filtered BPSK-modulated subcarrier signal; and generate a BPSK-demodulated signal in response to the detected amplitude peaks.

19. The test and measurement system of claim 18, wherein the test and measurement instrument is a mixed signal oscilloscope.

* * * * *